UNITED STATES PATENT OFFICE 2,343,368

GASKET MATERIAL

Le Grand Daly, Port Clinton, Ohio

No Drawing. Application July 10, 1940,
Serial No. 344,733

9 Claims. (Cl. 288—33)

The invention relates to a novel and improved synthetic composition for use as a packing material. It particularly relates to a composition of this nature containing a substantial amount of lignin. Lignin is a by-product of certain processes, such as paper manufacture, which processes result in the disintegration of wood, and in its original condition in the wood is an amorphous material in which the cellulose fiber is embedded. It is commercially available at a relatively low price since it is neither rare, nor, up to the present, in great demand.

There exists a definite need for a gasket material which will successfully resist impregnation by oils, grease, gasoline, etc., and the injurious effect of weathering and humidity over an extended period of use. It should be elastic to the extent that it yields under deforming forces, but tends to return to its original condition as the forces are relieved or withdrawn. Some gasket materials now available yield to deforming forces, but do not have sufficient inherent elasticity to offer resistance to these forces so as to maintain a satisfactory sealing or packing effect. In other words, these materials acquire a permanent set. Other available materials are soluble in hydrocarbon oils or disintegrate when in contact with such oils or with water. Still other gasket materials suffer deterioration or harmful variation in physical properties under changes in climatic conditions, such as humidity variations.

An object of the present invention therefore is to provide a novel composition of matter which is resistant to the harmful effects of contact with moisture and oils throughout the service life of the mechanism with which it is associated.

A further object is to provide a gasket material of this nature which exhibits and retains a degree of elasticity amply sufficient for this purpose. A further object is to provide a composition of matter which can be variably proportioned, within the limits hereinafter set forth, to provide for changes in requirement dependent on varying uses.

Other objects and advantages will be apparent on consideration of the description of my invention.

I have discovered that certain synthetic rubber compositions and particularly the polymerized chloroprene derivatives meet the above expressed needs, and exhibit the above described favorable characteristics, when I incorporate therein a substantial quantity of lignin. The durability of the material, that is to say, its ability to maintain a tight seal under compression for extended periods, is very markedly improved by the addition of lignin, while the resiliency of the compound and its resistance to oils are eminently satisfactory. Whereas with a number of existing gasket materials the product must be carefully wrapped to protect it from the effect of humidity and weathering during shipment and storage, my packing material needs no such precautionary measures.

Synthetic rubber compositions of this nature are usually made up from an organic base which exhibits many of the characteristics of natural rubber. Specific compounds may be purchased for example under the trade names "Duprene" or "Neoprene." There are generally added thereto certain ingredients classed under such descriptive heads as plasticizers, fillers, accelerators, pigments, etc. I find that the lignin may be substituted for all or a substantial part of the usual inert filler which has customarily been used in synthetic compositions which have been developed as rubber substitutes. It functions not merely as a material to add body to the compound, but as an active beneficial agent.

The objects of my invention are substantially achieved if I use from about 5% to 80% of lignin in conjunction with about 5% to 25% of a rubber substitute as described above.

As a preferred composition range for a gasket material I suggest the following:

| | Per cent by weight |
|---|---|
| Synthetic rubber | 5.0 to 25.0 |
| Magnesia | 0.1 to 1.0 |
| Zinc oxide | 0.5 to 2.0 |
| Litharge | 0.5 to 2.0 |
| Petroleum oil | 0.5 to 4.0 |
| Lignin | 5.0 to 80.0 |

In certain instances I may use from 0.5% to 2.0% of wood rosin. All the above materials are readily available commercially. The magnesia, zinc oxide, and litharge are well known inorganic compounds. The grade of oil I prefer to use is that usually termed a "medium process S. A. E. No. 20" oil, but any equivalent grade of mineral oil is satisfactory. Lignin as such is obtainable in quantity from paper manufacturing plants.

It may be noted that certain compositions within the range above tabulated may not completely account for a one hundred per cent compound. The balance, not to exceed fifty per cent, may be filled in from certain relatively inert fillers, such as asbestos, vermiculite, sisal or sericite without altering the essential characteristics of the material. Definite variations in physical properties may thus be obtained, not so much by additions of the fillers noted as by variations in the basic composition which requires addition of the fillers. I have also used kraft paper pulp as a filler, or a commercial product known as lignized fiber.

As a preferred composition within the above range I suggest the following. Synthetic rubber 18%, magnesia 0.3%, zinc oxide 1.8%, litharge 1.8%, mineral oil 3.6%, lignin 46%, asbestos 18%, vermiculite 9%, balance inert material or impurities.

This composition does not exhibit an exceptionally high tensile strength but it is very resilient and its physical properties are otherwise adequate. It may be used for a packing material where mating surfaces are brought together manually or under light pressure.

If a material is required for high pressure adaptations I use the following composition, in per cent by weight. Synthetic rubber 15%, magnesia 0.3%, zinc oxide 1.5%, litharge 1.5%, oil 3.0%, lignin 50%, asbestos fiber 21%, vermiculite 7.5%. This can be used for packing gaskets required to resist compression pressure encountered in machine assemblies which may run as high as 12,000 pounds per square inch. The increase in lignin content and the addition of asbestos have effected the desired change in properties.

For adaptations where steam pressures of 15 to 500 pounds per square inch must be gasketed, I use the following composition, in per cent by weight. Synthetic rubber 20%, magnesia 0.4%, zinc oxide 2%, litharge 2%, mineral oil 4%, lignin 20%, asbestos fiber 45%.

In the compounding of the above compositions the ingredients are ground, mixed, and thoroughly interspersed in any equipment suitable for the production of synthetic rubber compounds. As is well known to those skilled in the art, the operation may be performed for instance in mixing rolls or Banbury mixers which eventually produce sheet stock from the mix. The material as it issues from the compounding process is still quite plastic and may be further rolled, extruded, molded or otherwise treated to produce sheet or other articles of desired contour. At this point in the process the sheet, of suitable thickness, may be cut into gaskets or other required shapes. In order to impart the desired final physical properties, the articles are subjected to a thermal treatment of from about 30 minutes to 5 hours at between 250° F. and 400° F. I prefer to carry out this treatment in a closed container under air pressure of about 5 to 50 pounds per square inch, the heat being supplied by steam pressure. The pressure, which, if uncontrolled, will of course vary with the temperature, should be controlled by suitable and familiar means. I prefer to stack the material in layers since the pressure serves to maintain a compact stack so as to prevent gaseous impregnation of the material which is quite soft at the start of the treatment. To prevent adhesion of the adjoining layers they may be dusted with powdered mica or soapstone. Generally speaking the time required to completely heat treat the compound varies inversely with the temperature, so that as the temperature is increased the time is shortened. I prefer to use the lower temperatures and longer times since this seems to give a better resistance to oil impregnation.

Scrap products, such as clippings or reclaim material may be fed back into the process in manner well known in the art of making synthetic rubber compositions.

The use of substantial quantities of lignin is a very important factor in cost reduction. Gasket material of this nature finds a large market in the automotive field and a substantial saving in cost in even a single gasket may mean the difference between acceptance and rejection of the article even if its properties were otherwise outstanding.

In addition to the synthetic rubber compounds specifically mentioned hereinabove, namely the polymerized chloroprene derivatives, I may use certain other well known rubber-like materials such as the olefin polysulphide resins, the polymerized butadiene hydrocarbons, or certain of the halogenated rubbers. It is to be understood that materials of this nature are comprehended under the term "synthetic rubber" in the appended claims, and in this specification. It is to be further understood that in certain tabulations herein, and in certain of the claims, a given range such as, for example, "5 to 25% of synthetic rubber and 5 to 80% of lignin" is not arithmetically inconsistent, since the lignin and synthetic rubber are not simultaneously used at the upper end of the range and of course the specific total content always equals one hundred per cent.

What I claim is:

1. A composition of matter for use as a gasket material containing from 5% to 25% of polymerized chloroprene, from 0.1% to 1.0% of magnesia, from 0.5% to 2.5% of zinc oxide, from 0.5% to 2% of litharge, from 0.5% to 4% of mineral oil, from 5% to 80% of lignin, the balance being composed of filler material.

2. A composition of matter for use as a gasket material containing about 18% of polymerized chloroprene, about 0.3% of magnesia, about 1.8% of zinc oxide, about 1.8% of litharge, about 3.6% of mineral oil, and about 46% of lignin.

3. As an article of manufacture, a gasket made from a synthetic compound containing from 5% to 25% of a rubberlike, polymerized chloroprene and from 5% to 80% of lignin, said gasket being characterized by improved resistance to oil impregnation, weathering, and permanent set.

4. As an article of manufacture, a gasket made from a synthetic compound containing from 5% to 25% of polymerized chloroprene, from 5% to 80% of lignin, from 0.1% to 1% of magnesia, from 0.5% to 2.5% of zinc oxide, from 0.5% to 2% of litharge, and from 0.5% to 4% of mineral oil, and characterized by improved resistance to oil impregnation, weathering, and permanent set.

5. A heat and oil resisting gasket comprising a yieldable rubber-like resilient mass having a major portion by weight consisting of particles of unmodified lignin and a minor binder portion, said binder portion comprising bodies of polymerized 1-3 dichloro butadiene intimately distributed throughout voids between said lignin particles and so fixed thereto as to form resiliently deflectable bonds therebetween for restoring said gasket from a compressed state.

6. A heat and oil resisting gasket comprising a yieldable rubber-like resilient mass having a major portion by weight consisting of particles of unmodified lignin and a minor binder portion, said binder portion comprising bodies of polymerized chlorine bearing rubber-like polymer intimately distributed throughout voids between said lignin particles and so fixed thereto as to form resiliently deflectable bonds therebetween for restoring said gasket from a compressed state.

7. As an article of manufacture, a gasket made from a synthetic compound containing lignin and rubber-like polymerized chloroprene, the amount of lignin and chloroprene being in excess of fifty per cent of the total compound, said gasket being characterized by improved resistance to oil impregnation, weathering, and permanent set.

8. As an article of manufacture, a gasket made from a synthetic compound containing lignin and rubber-like polymerized chloroprene, the amount of lignin and chloroprene being in excess of fifty per cent of the total compound, and the amount of lignin being in excess of the amount of polymerized chloroprene, said gasket being characterized by improved resistance to oil impregnation, weathering, and permanent set.

9. As an article of manufacture a gasket made from a synthetic compound containing lignin and rubber-like polymerized chloroprene and filler material, the amount of lignin being in excess of the amount of chloroprene, and the total amount of lignin and chloroprene being in excess of the amount of filler material, said gasket being characterized by improved resistance to oil impregnation, weathering, and permanent set.

LE GRAND DALY.